(12) United States Patent
Kingsbury et al.

(10) Patent No.: US 10,751,734 B2
(45) Date of Patent: Aug. 25, 2020

(54) CERAMIC HYDROCYCLONE

(71) Applicant: NOV Process & Flow Technologies AS, Fornebu (NO)

(72) Inventors: John Kingsbury, Slough Berkshire (GB); James Vanjo-Carnell, Camberley Surrey (GB); Tarig Mukthar Abdalla, Amstelveen (NL)

(73) Assignee: NOV PROCESS & FLOW TECHNOLOGIES AS, Fornebu (NO)

( * ) Notice: Subject to any disclaimer, the term of this patent is extended or adjusted under 35 U.S.C. 154(b) by 346 days.

(21) Appl. No.: 15/872,101

(22) Filed: Jan. 16, 2018

(65) Prior Publication Data

US 2018/0200733 A1    Jul. 19, 2018

(30) Foreign Application Priority Data

Jan. 17, 2017 (NO) .................................. 20170072

(51) Int. Cl.
| | |
|---|---|
| *B04C 5/085* | (2006.01) |
| *B01D 21/26* | (2006.01) |
| *B04C 5/28* | (2006.01) |
| *B04C 5/04* | (2006.01) |
| *B04C 5/08* | (2006.01) |

(52) U.S. Cl.
CPC ............ *B04C 5/085* (2013.01); *B01D 21/267* (2013.01); *B04C 5/04* (2013.01); *B04C 5/08* (2013.01); *B04C 5/28* (2013.01)

(58) Field of Classification Search
CPC .... B04C 5/02; B04C 5/04; B04C 5/08; B04C 5/085; B04C 5/103; B04C 5/12; B04C 5/13; B04C 5/14; B04C 5/24; B04C 5/28; B04C 5/00; B01D 45/12; B01D 45/16; B01D 21/26; B01D 21/267; B01D 2221/00; B01D 45/00; B01D 21/262; B01D 17/0217; B03B 5/32; B03B 5/34; C02F 1/38
See application file for complete search history.

(56) References Cited

U.S. PATENT DOCUMENTS

| | | | |
|---|---|---|---|
| 2,816,658 A * | 12/1957 | Braun ...................... | B04C 5/081 209/732 |
| 3,136,723 A * | 6/1964 | Erwin ....................... | B04C 5/14 210/512.1 |
| 3,371,794 A | 3/1968 | Johnson | |

(Continued)

OTHER PUBLICATIONS

Search Report dated Jul. 6, 2017 in corresponding Norwegian Application No. 20170072, with translation.

*Primary Examiner* — David C Mellon
(74) *Attorney, Agent, or Firm* — Wenderoth, Lind & Ponack, L.L.P.

(57) ABSTRACT

A hydrocyclone for separation solid particles from a liquid is disclosed. The hydrocyclone includes a ceramic cyclone head, a ceramic cyclone main body, and a metal enclosure. The metal enclosure includes at least an upper metallic enclosure part and a main metallic enclosure part. A lower section of the upper metallic enclosure part includes mateable circumferential threads and an upper section of the main metallic enclosure part includes mateable circumferential threads. The mateable circumferential threads of the upper metallic enclosure part and the mateable circumferential threads of the main metallic enclosure part are mateable with each other.

20 Claims, 6 Drawing Sheets

(56) References Cited

U.S. PATENT DOCUMENTS

| | | | |
|---|---|---|---|
| 3,902,601 A | * | 9/1975 | Townley ................. B04C 5/085 |
| | | | 209/720 |
| 3,988,239 A | * | 10/1976 | Malina .................... B04C 5/085 |
| | | | 55/435 |
| 4,053,393 A | | 10/1977 | Day et al. |
| 4,539,105 A | * | 9/1985 | Metcalf .................... B04C 5/08 |
| | | | 156/84 |
| 4,793,925 A | | 12/1988 | Duvall et al. |
| 6,109,451 A | * | 8/2000 | Grimes .................... B04C 3/00 |
| | | | 209/725 |
| 2011/0297605 A1 | * | 12/2011 | Ross ........................ B04C 5/08 |
| | | | 210/232 |
| 2013/0175203 A1 | * | 7/2013 | Hypes ................... B01J 8/0055 |
| | | | 208/177 |

* cited by examiner

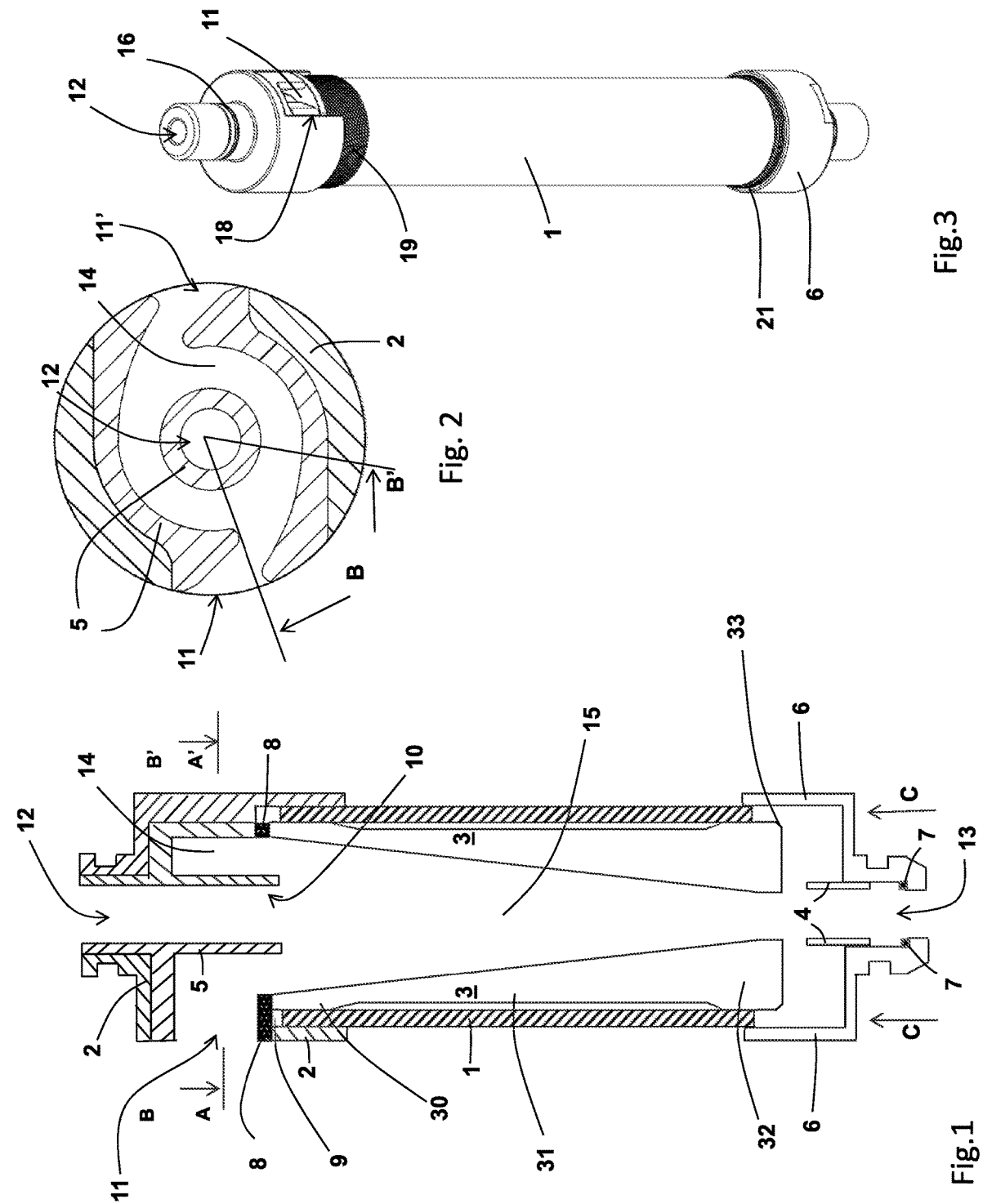

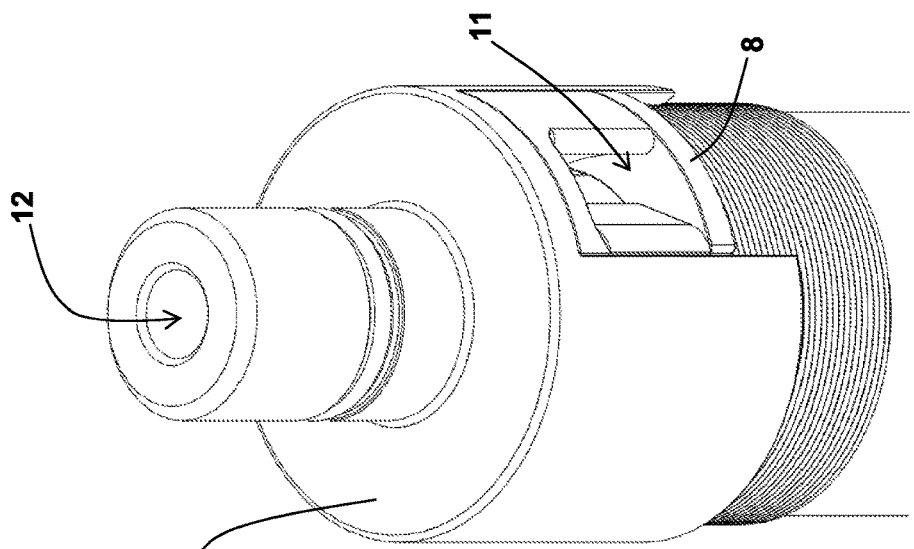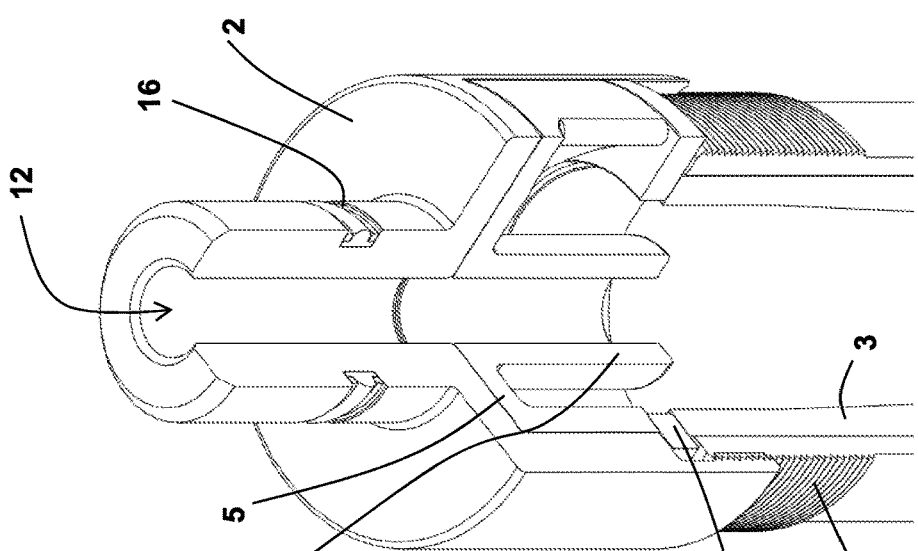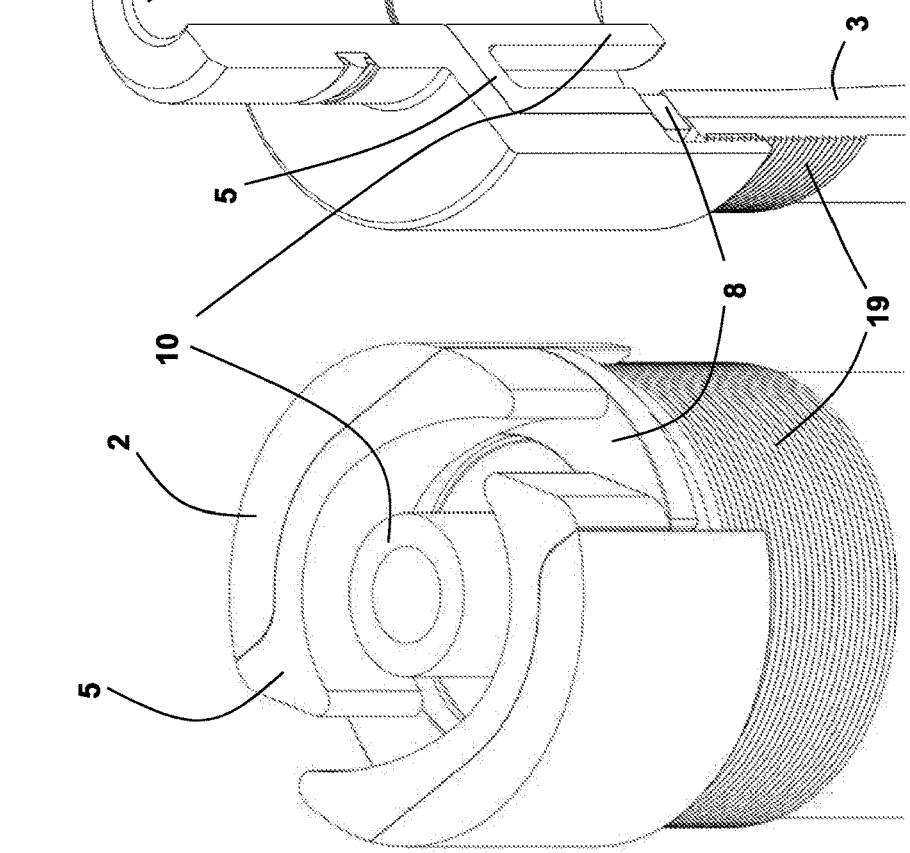

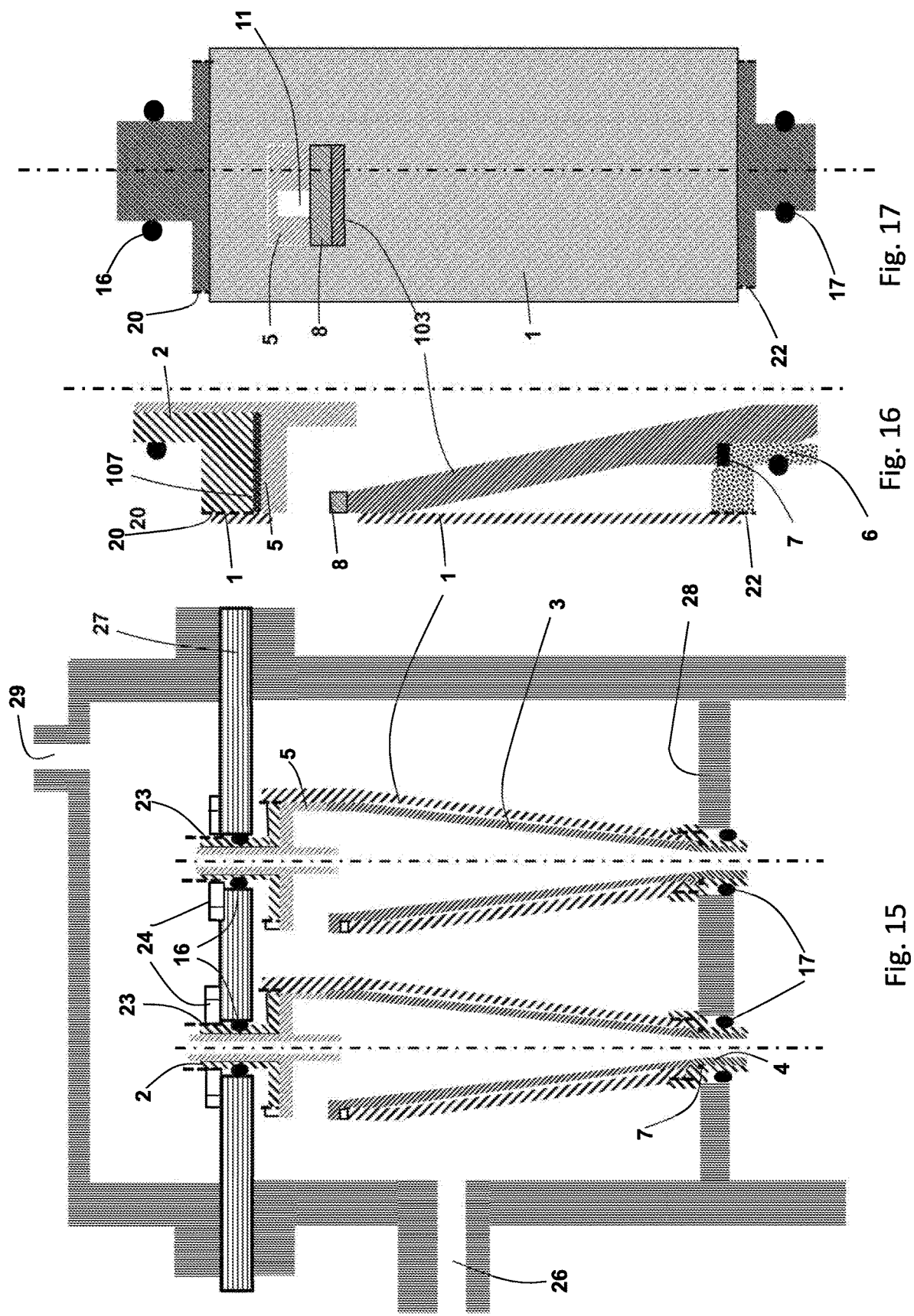

CERAMIC HYDROCYCLONE

The present invention relates to a cyclone, more specifically to a hydrocyclone for separation solid particles from a liquid, especially a ceramic hydrocyclone comprising at least two ceramic parts.

BACKGROUND

Hydrocyclones as such are well known and used for separating multi-phase fluid streams, such as for separating a gaseous fraction, a lighter liquid fraction or a solid particle fraction from a liquid fraction. The fluid to be separated is led tangentially into a cyclone body causing the fluid to spin and the lighter fraction to be remove via a vortex finder in the upper section and the heavier fraction to accumulate in the lower section from where it is removed through a bottom outlet.

Hydrocyclones are for instance used in upstream oil production to separate solids from produced water (pw desanding) or for desanding liquid hydrocarbon streams at the wellhead or as one of the steps of a wellstream treatment process. The hydrocyclones thereby prevent the build-up of sand in equipment such as separators and pipelines and protect sensitive equipment such as export pumps and heat exchangers from solid particles. The liquid-solid mixture is fed through an inlet at the top of the hydrocyclone and the rotational motion causes dense sand particles to separate from the less dense liquid.

Hydrocyclones are used in produced water desanding for solid/liquid separation. There is increasing legislation to prevent discharge of solid-contaminated water and a cyclone process can be very effective to remove solid contaminants from water.

The hydrocyclones have to be designed to withstand the flow of the abrasive sand particles. The liner/lining of a hydrocyclone system may therefore be manufactured in alumina ceramic or other ceramic material which is robust enough to withstand severe abrasion caused by the sand particles.

The ceramic material of the liner can further be selected to withstand the harsh environments within the oil and gas industry and improve resistance to deterioration caused by harsh design conditions such as mechanical loads, vibrations, chemicals etc., which hydrocyclones often are exposed to within the oil and gas industry.

PRIOR ART

US2011297605 discloses a cyclone assembly with a modular body preferably made of polytetrafluoroethylene, and comprising a lower body including a ceramic apex. The assembly does not comprise more than one ceramic part and is especially adapted to handle highly corrosive fluids.

U.S. Pat. No. 9,162,164 discloses a hydrocyclone liner consisting of several sections joined together via a bond and an outer sleeve arranged around the bond. The joined sections can be made of alumina ceramic. The bond provides an adhesive connection between the parts which, in connection with maintenance and repair, makes exchanging only one of the parts difficult or even impossible. Further, an outer sleeve may be fastened to the liner via epoxy adhesive or shrink fitting, which further makes it difficult to separate the different parts and exchange only one part if for instance only one part is damaged. The compactness of a hydrocyclone is related to difference between the effective diameter of the hydrocyclone, i.e. to the necessary outer diameter of the parts exposed to wear during operation (i.e. the outer diameter of the ceramic inlet head) and the maximum outer diameter of the hydrocyclone that includes all protective and/or assembling enclosures. Using an outer sleeve according to U.S. Pat. No. 9,162,164 increases the outer diameter of the hydrocyclone without increasing the effective diameter and therefore results in a reduction of the compactness of the hydrocyclone.

SUMMARY OF THE INVENTION

An objective of the present invention is to provide a hydrocyclone with a ceramic liner/lining where different ceramic parts of the liner can be assembled without forming adhesive joints or where the different parts of the liner can be exchanged without having to break an adhesive joint/connection.

A further objective of the present invention is to provide for a hydrocyclone with the possibility to include a complexed structured ceramic cyclone head. A further objective is to provide a ceramic liner where the different ceramic parts of the liner are kept in position relative to each other, even when exposed to changes in temperature. It is also an objective to provide a compact hydrocyclone with a high efficiency compared to maximum outer diameter. A further objective of the present invention is to provide external protection for the main part and preferably almost all of the ceramic parts.

In one aspect, the objective of the present invention is to provide, at the same time, a hydrocyclone with a liner of ceramic parts assembled without the use of adhesive joints, wherein the maximum outer diameter of the hydrocyclone is kept at a minimum or minimized, whilst still being able to provide the necessary size and shape of ceramic inlet feed, for imposing an efficient cyclonic action on the inside of the hydrocyclone, and further also whilst both compressing the ceramic parts, and externally protect the ceramic parts by an enclosure of surrounding metal parts.

A further objective is to provide a hydrocyclone, wherein the feed inlet is resistant to wear and abrasion. A further objective is to provide a hydrocyclone with a ceramic liner comprising ceramic parts that are sealed within a metal housing/enclosure, thereby providing a leakage free liner.

The present invention involves a hydrocyclone comprising
- a ceramic cyclone head with at least one feed inlet, an upper outlet, and a head chamber
- a ceramic cyclone main body with a lower outlet and a main chamber, wherein ceramic cyclone main body is connected to the ceramic cyclone head so that the head chamber is in fluid communication with the main chamber;
- a metal enclosure with a corresponding feed inlet opening and corresponding outlet openings, and wherein the metal enclosure comprises at least an upper metallic enclosure part adapted to enclose at least part of the ceramic cyclone head and a main metallic enclosure part adapted to enclose at least part of the ceramic cyclone main body, wherein the upper metallic enclosure part comprises circumferential threads in a lower section thereof and the main metallic enclosure part comprises circumferential threads in an upper section thereof, wherein said circumferential threads are mateable.

The metal enclosure comprises feed inlet opening and upper outlet corresponding to the feed inlet and upper outlet of the ceramic cyclone head and the metal enclosure further comprises a lower outlet corresponding with the lower outlet of the ceramic cyclone main body.

The configuration of the hydrocyclone allows inter alia for the different ceramic parts of the liner to be kept in position relative to each other and for the exchange of the different ceramic parts of the liner without having to break any parts or permanent bonds within the hydrocyclone.

In an aspect of the present invention the main metallic enclosure part encloses the substantially entire ceramic cyclone main body, however, in another aspect of the present invention the part of the ceramic main body forming the lower outlet opening may extend axially beyond the metallic enclosure part at the lower outlet.

Further, the ceramic cyclone head forming the upper outlet may extend beyond the metallic enclosure part at the upper outlet.

In a further aspect of the invention, the ceramic cyclone head has an outer periphery with variable radial extension,
wherein one of the metallic enclosure part sections comprising mateable circumferential threads comprises at least one open ended slot across the mateable circumferential threads;
wherein the width of the at least one slot fits a first section of the ceramic cyclone head comprising the at least one feed inlet,
wherein the outer periphery of said first section of the ceramic cyclone head extends further radially than an outer diameter of the circumferential mateable threads, and
wherein the outer periphery of at least one second section of the ceramic cyclone head has a radial extension which is equal to or less than the outer diameter of the mateable circumferential threads,
thus providing a hydrocyclone wherein merely or preferably only the ceramic parts of the feed inlet are exposed to wear and abrasion and wherein the slot can secure against rotational movements of ceramic and metal parts relative to each other.

In a further aspect the axial height of the at least one slot is at least the same or taller than the sum of the height of an overlap of the mateable threads, the height of a ceramic inlet floor and the height of the feed inlet, thus ensuring a height of the slot that will not overlap or close the feed inlet of the hydrocyclone.

The ceramic inlet floor should be understood as the base of the feed inlet of the hydrocyclone and comprises a ceramic element.

In a further aspect the upper metallic enclosure part and the main metallic enclosure part each comprises an external metallic sealing surface comprising respectively an upper external sealing and a lower external sealing for connecting the outlets, for instance, to an arrangement where the hydrocyclone is arranged in a hydrocyclone chamber, such an arrangement would maintain the hydrocyclone in position and maintain the required pressure difference for the cyclone to operate. The external sealings can be adapted to make up for any differences in thermal expansion, thus providing a fixed connection between the hydrocyclone and the arrangement.

In a further aspect of the invention, the at least one slot is in the main metallic enclosure part. Alternatively, the at least one slot is in the upper metallic enclosure part.

The hydrocyclone according to the invention may further comprise a ceramic washer arranged to be compressed in between the ceramic cyclone head and the ceramic cyclone main body, wherein the ceramic washer has an inner diameter that is equal to or larger than an inner diameter of the ceramic cyclone head which it is to be compressed against, wherein the ceramic washer also forms the floor of the at least one inlet, in that the ceramic washer within the slot opening of the metal enclosure extends further radially than the outer diameter of the said mateable circumferential threads, wherein other sections of the ceramic washer extend radially equal to or less than an inner diameter of the main metallic enclosure part. Thereby the ceramic washer is kept in position relative to the metallic enclosure part comprising the at least one slot.

The ceramic washer and ceramic cyclone main body is in one embodiment one integral part. In this aspect, the main body comprises an end surface part identical to the washer that forms the floor of the ceramic cyclone inlet. This reduces the number of ceramic parts and also keeps the main enclosure part and the main body with the integrated washer section in position relative to each other as the washer section is arranged in the slot and the main part will not be able to rotate relative to the main body.

In a further aspect of the invention, the ceramic cyclone head comprises a separate ceramic roof part and where the ceramic cyclone main body, the ceramic washer and the remaining parts of the ceramic head is one integral ceramic part. In this aspect, the hydrocyclone comprises only two ceramic parts, the ceramic head roof part and the extended main body.

In another aspect of the invention, the ceramic cyclone main body consists of several ceramic elements, allowing different elements to be exchanged when needed.

The hydrocyclone may further comprise an insert sealing for transferring compression force from the metal enclosure to the ceramic parts, such that the ceramic parts are maintained in position within the metal enclosure.

Further, the main metallic enclosure part may comprise a separate lower metallic enclosure part connectable to the main metallic enclosure part, and wherein the insert sealing is a lower insert sealing transferring compression between the ceramic cyclone main body and the lower metallic enclosure part.

In an aspect of the invention the insert sealing is an upper insert sealing transferring compression between the ceramic cyclone head and the upper metallic enclosure part.

In a further aspect of the invention, the hydrocyclone comprises both an upper insert sealing and a lower insert sealing.

In a further aspect of the invention, a plurality of hydrocyclones are installed in a chamber or container. In this embodiment the upper metallic enclosure part of the hydrocyclones comprise upper external threads on the upper outlet, wherein the external threads are adapted for securing the upper part of the hydrocyclones with a nut to a first pressure retaining plate within the chamber and wherein the chamber further comprises a second pressure retaining plate spaced apart from the first plate, wherein the second plate is adapted to receive and maintain the lower end of the hydrocyclones in position.

In a further aspect of the invention, the outer diameter of an upper section and a lower section of the ceramic cyclone main body is larger than the outer diameter in the section in between the upper section and the lower section of the ceramic cyclone main body, and wherein an inner diameter of an upper section of the main metallic enclosure part is at least 0.03 mm larger and maximum 0.5 mm larger than said outer diameter of the upper section of the ceramic cyclone main body, providing a hydrocyclone with a high efficiency. Further, this embodiment provides a compact hydrocyclone allowing a plurality of hydrocyclones, having a relative small footprint, to be arranged in a chamber, wherein the chamber comprises a feed inlet and an upper outlet.

In a further aspect of the invention, the ceramic cyclone head forms two side walls extending from the feed inlet, wherein each side wall has a variable thickness and curvature in a radial direction. The curvature of the side walls provides an imported spin/swirling motion from the feed inlet when moving towards the radial central part of the hydrocyclone.

In a further aspect of the invention,
the ceramic cyclone head has an outer periphery with variable radial extension,
wherein one of said sections of mateable circumferential threads comprises at least one open ended slot across the mateable circumferential threads;
wherein the width of the at least one slot fits a first section of the ceramic cyclone head comprising the at least one feed inlet,
wherein the outer periphery of said first section of the ceramic cyclone head extends further radially than an inner diameter of one of the metallic enclosure parts.

As used herein the term "insert sealing" should be understood to comprise sealing structures such as washers, gaskets, spring washers, disc spring washers and Belleville washers or a combination thereof. The "insert sealing" is adapted to make up for differences in the thermal expansion between the metallic and ceramic parts.

As used herein the terms "lower" and "upper" are used to refer to the normally selected vertical installation direction of hydrocyclones, with feed inlet and low density outlet in the upper part with respect to the direction of gravity and the outlet for high density fraction in the lower end with respect to the direction of gravity. If installed horizontally the term "upper" refers to the feed inlet end and "lower" refers to the high density fraction outlet end.

As used herein the term "substantially entirely enclosing" should be understood as enclosing all the radial surfaces of the ceramic cyclone main body, but not necessarily the axial end surfaces at the outlet.

The head chamber as disclosed herein is formed by the ceramic cyclone head and is the chamber which surrounds the outer surface of the vortex finder which forms the upper outlet of the hydrocyclone.

The ceramic cyclone main body surrounds a cone shaped main chamber which is tapered from the head chamber towards the lower outlet of the hydrocyclone.

The ceramic cyclone main body may consist of several ceramic elements/parts, wherein the ceramic cyclone main body is split into longitudinal sections in the vertical direction and/or in horizontal cylindrical sections.

The ceramic cyclone main body may in one embodiment comprise, as an integrated part thereof, a ceramic insert as a tube shaped extension of the lower end of the cone shaped main chamber. Alternatively, the ceramic insert may be a separate ceramic part of the hydrocyclone.

The main metallic enclosure part may in one embodiment comprise, as an integrated part thereof, a lower metallic enclosure part adapted to enclose the ceramic insert, the insert sealing and part of the lower end surface of the ceramic cyclone main body. Alternatively, the lower metallic enclosure part may be a separate metallic part connectable to the main metallic enclosure part via mateable threads on respectively the lower part of the main metallic enclosure part and the upper part of the lower metallic enclosure part.

In a further aspect of the invention, the ceramic parts of the liner are complex in that the inlet section of the ceramic cyclone head has two internal side walls, each side wall having a curvature or complex (i.e. not straight) shape in the radial direction, requiring the ceramic cyclone head to be horizontally split into two, or to be open ended for the feed inlet to be manufactured. The curvature of each of these side walls can be independently variable across the radial extension.

In a further aspect of the invention, the hydrocyclone comprises a ceramic cyclone head having an outer periphery with variable radial extension and thickness.

In a further aspect of the invention, the number of cyclone feed inlets may be one two or more. If only one cyclone inlet is utilized, the axial center of the upper or lower outlet may be excentrical to the axial center of the main metallic enclosure part.

BRIEF DESCRIPTION OF THE DRAWINGS

The present invention will be described in further detail with reference to the enclosed figures wherein:

FIG. 1 is a schematic partly exploded cross sectional view in the axial direction of a hydrocyclone along the lines B and B'.

FIG. 2 is a schematic illustration of the cross section of the head section along the line A-A'

FIG. 3 shows schematically a hydrocyclone in perspective.

FIG. 4 illustrates the upper section of a hydrocyclone with the part above the line A-A' remover for illustrative purposes.

FIG. 5 illustrates the upper section of a hydrocyclone with the section between the lines B and B' removed for illustrative purposes.

FIG. 6 illustrates the upper section of a hydrocyclone in perspective.

FIG. 15 a schematic cross sectional illustration of two hydrocyclones arranged in a chamber.

FIG. 16 illustrates a cross sectional view in the axial direction of a hydrocyclone along the line B.

FIG. 17 schematically illustrates the side view of the hydrocyclone of FIG. 16.

Figure 9:
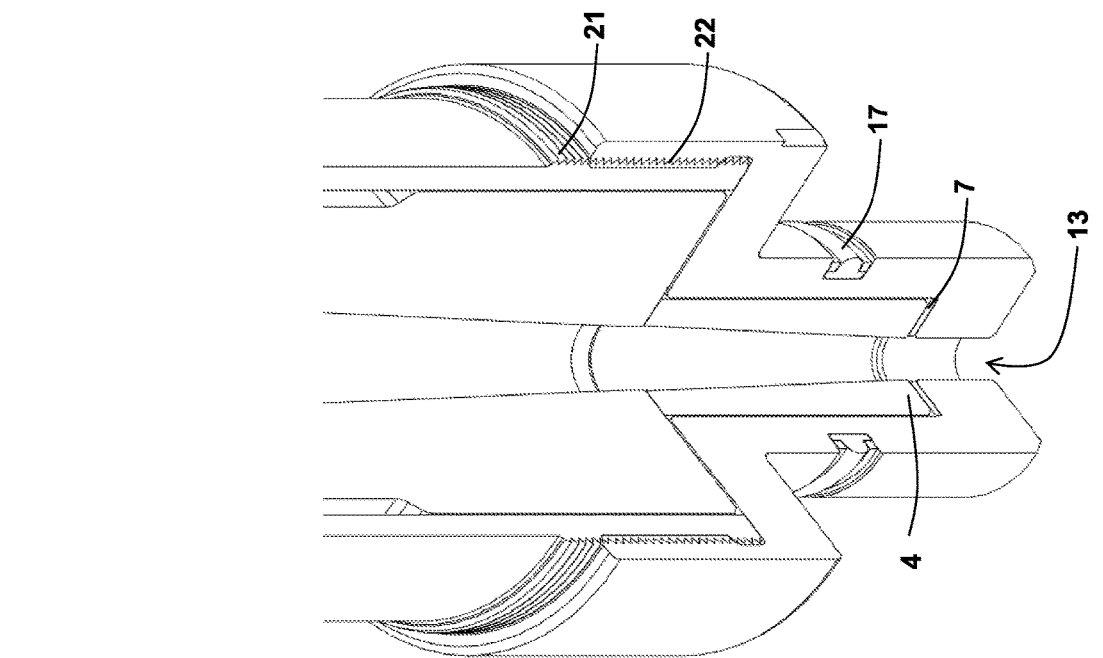
FIG. 9 illustrates the lower section of a hydrocyclone with the section between the lines B and B' removed for illustrative purposes.

The figures are only schematic representations and not drawn to scale.

The figures are illustrations of embodiments of the present invention. A person skilled in the art will appreciate that details shown in different drawings may be combined to provide other embodiments of the present invention.

DETAILED DESCRIPTION OF THE INVENTION

FIG. 1 illustrates a first embodiment of the present invention. This cross sectional view is taken along the lines B and B' marked on FIG. 2. For illustrative purposes this provides a cross section across the feed inlet 11 (line B) and a section not comprising a feed inlet (line B'). The hydrocyclone may comprise at least one feed inlet 11, but can also comprise two or more. In FIG. 2 the illustrated embodiment comprises two feed inlets 11,11' arranged opposite of each other. The cyclone head 5 forms a head chamber 14 surrounding the vortex finder 10 which forms the upper outlet 12. The upper metallic enclosure part 2 encloses the head 5 and comprises openings corresponding to the feed inlet 11,11' and the upper outlet 12. The ceramic washer 8 extends together with the feed inlet 11,11' of the head 5 into the opening in the upper metallic enclosure part 2. The cyclone main body 3 surrounds a main chamber 15 which is cone shaped. The main body 3 is in direct contact with the lower side of the washer 8. The main enclosure part 1 is connected to the upper part 2 by mateable circumferential threads providing a gap 9 there between so that the main enclosure part 1 is not compressed against the washer 8.

The lower end of the hydrocyclone is shown in an exploded view. A lower metallic enclosure part 6 is via internal circumferential threads arranged to be screwed in the direction C onto the lower end of the main enclosure part 1 comprising mateable external circumferential threads. A ceramic insert 4 will thereby be compressed against the lower surface of the main body 3 by the insert sealing 7 arranged in the lower metallic enclosure part 6 in the section corresponding to the lower outlet 13.

The ceramic main body 3 comprises an upper section 30, a lower section 32 and an in between section/intermediate section 31. The outer diameter of the in between section 31 is smaller than the diameter of the upper and lower sections 30 and 32.

This configuration allows for machining of the ends of the main part to fit the ceramic main body 3 but at the same time easies the insertion of the ceramic main body 3 in the main enclosure part 1.

Similarly, the illustrated rounded corners 33 makes the insertion into the main part easier.

FIG. 2 illustrates the cross section of the head along the line A-A'. At the feed inlet 11,11' the outer diameter of the ceramic head 5 extends to the outer diameter of the upper metallic enclosure part 2, however in alternative embodiments the parts of the ceramic head may extend beyond the outer diameter (not shown) of the upper metallic enclosure part and/or the top of the upper metallic enclosure part (not shown).

As shown in FIG. 2, the ceramic head 5 forms two inside walls within the chamber head having a complex structure. The inside walls are forming the tangential feed inlet and extend from the one feed inlet 11 to the other feed inlet 11', wherein the two side walls have a variable thickness and provide a curvature from the one feed inlet to the other. The curvature of each of these inside walls can however be independently variable across the radial extension. Further, the shape of the inside walls at the tangential inlet provide an increased velocity of the feed by the reduced cross-section of the inlet.

Also as shown in FIG. 2, the outside outer periphery of the ceramic head has a variable radial extension. This volumetric allows for the ceramic head to both have an optimized shape of the inside walls, and to in a compact manner be enclosed by a metal enclosure that can fit smoothly outside the outer periphery of the ceramic head, where the complex structure of the ceramic head 5 contributes to a more beneficial distribution of the reaction forces and spinning/rotational forces from the ceramic head against the metal enclosure. Further, the variable radial outer periphery of the ceramic head allows for the head to be secured against rotation, reduces ceramic stress loads, optimizes the feed inlet, and a compact sealed assembly is obtained inside the metal enclosure.

The complex structure of the ceramic cyclone head 5 is made possible by the present invention in that the head section 5 does not comprise the floor made up by the ceramic washer (see FIG. 1) at the feed inlet 11,11'. Thereby the ceramic head 5 can be produced by molding wherein the mold can be extracted in the axial direction. This allows for the ceramic cyclone head 5 to be easily exchanged when needed by axially inserting or removing the cyclone head from the metallic enclosure when the upper and lower metallic enclosure parts are disconnected.

FIG. 3 is a perspective view of the hydrocyclone showing a slot 18 in the mateable threads in the upper enclosure part 2 corresponding to the feed inlet 11. Further, outer threads 19 at the upper end and 21 at the lower end of the main enclosure part 1 are visible. On a connection surface, on the external side of the upper outlet 12, an upper external sealing 16 is arranged.

Assembling a hydrocyclone according to the invention may comprise the steps:

Step 1: inserting sealing 7 and lower ceramic insert 4 into lower enclosure part (bottom cap) 6, and turn lower enclosure part 6 against main enclosure part 1;

Step 2: inserting ceramic main body 3 into main enclosure part 1;

Step 3: inserting ceramic cyclone head 5 and ceramic washer 8 into upper enclosure part (top cap) 2;

Step 4: turn main enclosure part 1 against upper enclosure part 2 to secure ceramic main body 3 to ceramic washer 8, and finishing the total assembly.

As the hydrocyclone is assembled by screwing the metallic enclosure parts together the hydrocyclone can be disassembled by unscrewing the metallic enclosure parts allowing for replacement of any part thereof, ceramic, metallic or other.

FIG. 4 is a perspective view of the head section cut along the line A-A' of FIG. 1. During assembling, the spinning of the ceramic head 5 and ceramic washer 8 in relation to the upper enclosure part 2 is stopped by the fact that some of the outer periphery of the said ceramic parts extends into the slot opening in the metallic enclosure part 2. Here it is also visible how the washer 8 forms the floor in the feed inlet. The smooth tangential inlet with the rounded corners has the effect of reducing the pressure loss, and improving the separation performance. The smooth fit of the head into the upper enclosure further contributes to a more beneficial distribution of the forces including spinning/rotational forces.

FIG. 5 shows the upper section but instead with the circle section between B and B' of FIG. 2 removed.

FIG. 6 shows the perspective view of the same upper section as FIGS. 4 and 5.

Figure 7:
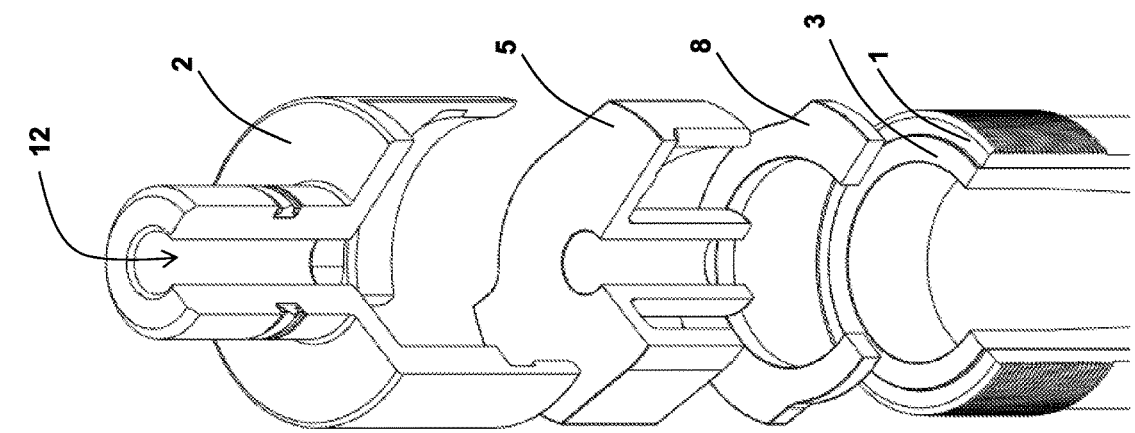
FIG. 7 illustrates an exploded view of the upper section of a hydrocyclone with the section between the lines B and B' removed for illustrative purposes.

FIG. 7 is an exploded view of the elements shown on FIG. 5.

Figure 8:
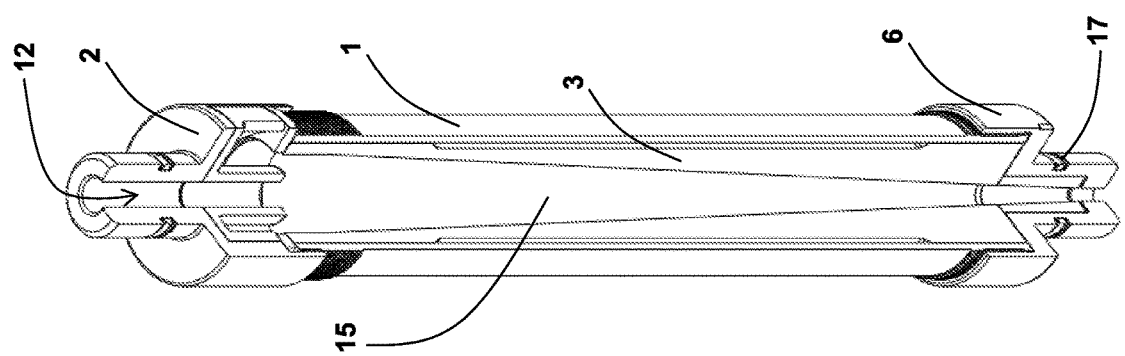
FIG. 8 illustrates a hydrocyclone with the section between the lines B and B' removed for illustrative purposes.

FIG. 8 shows the whole hydrocyclone where the circle section between B and B' of FIG. 2 removed. Visible here is that the lower outlet comprises a lower external sealing 17 on the outer sealing surface thereof.

FIG. 9 is an enlarged view of the lower section of FIG. 8. The main metallic enclosure comprises a lower enclosure part screwed onto the lower end of the main part via mateable threads 21 and 22.

Figure 11:
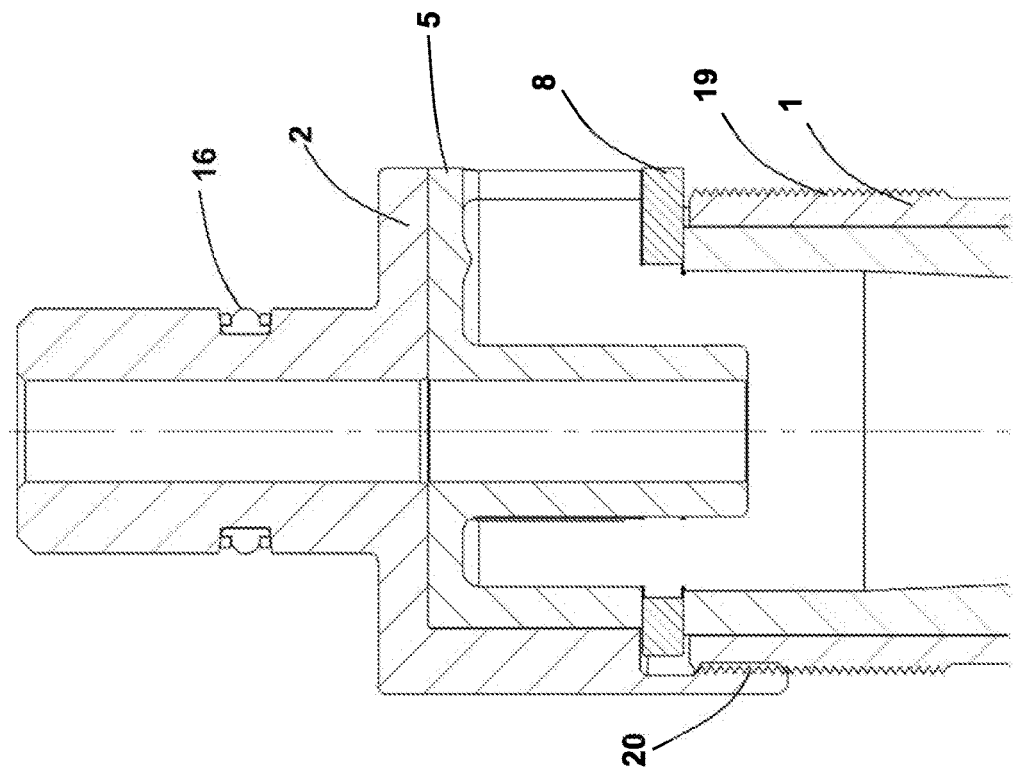
FIG. 11 shows a cross sectional view in the axial direction of the upper section of a hydrocyclone along the lines B and B'.
Figure 10:
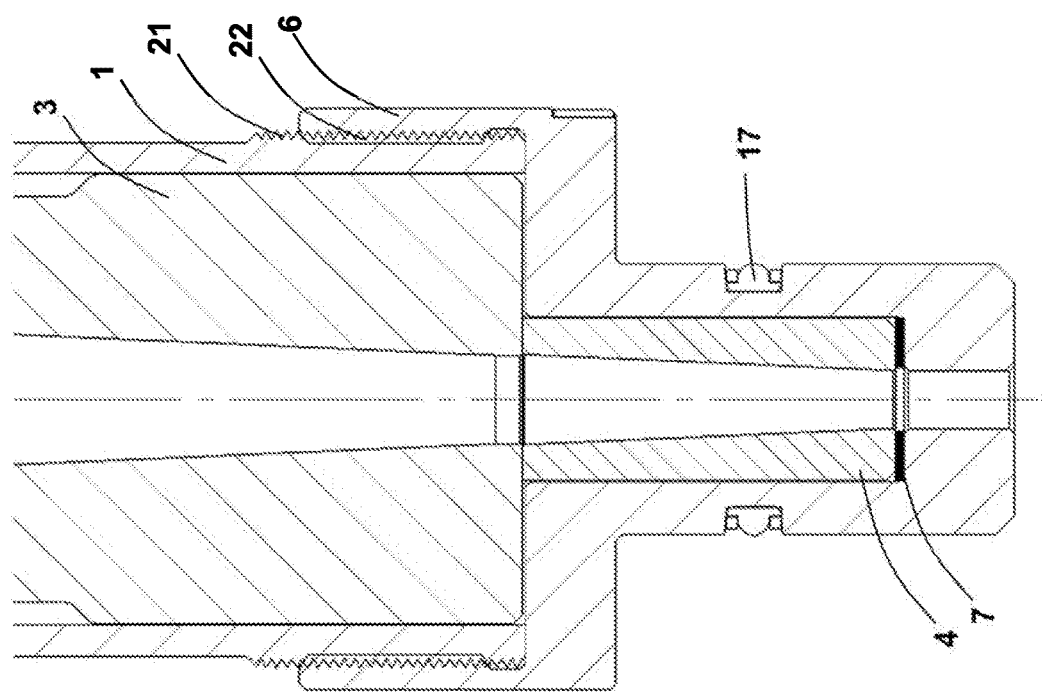
FIG. 10 shows a cross sectional view in the axial direction of the lower section of a hydrocyclone along the lines B and B'.

FIG. 10 and FIG. 11 show respectively cross-sectional views of the lower and upper section of a hydrocyclone.

Figure 12:
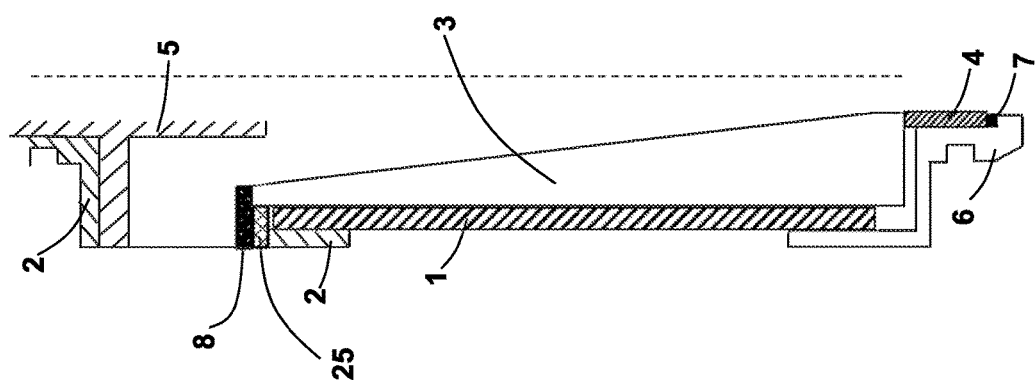
FIG. 12 illustrates a cross sectional view in the axial direction of a hydrocyclone along the line B.

FIG. 12 illustrate an embodiment further comprising a metal washer 25 which outer circumferential matches the ceramic washer 8, but where the inner diameter fits the outer diameter of ceramic main body 3.

For this embodiment assembling may comprise:

Step 1: inserting ceramic inlet 5 into upper enclosure part (top cap) 2, and then inserting ceramic washer 8 and metal washer 25;
Step 2: turning main enclosure part 1 against the upper enclosure part 2 to secure all elements inserted in step 1;
Step 3: inserting main ceramic body 3 into main enclosure part 1;
Step 4: inserting sealing 7 and lower ceramic insert 4 into lower enclosure part (bottom cap) 6 and turning lower enclosure part 6 against main enclosure part 1.

Figure 14:
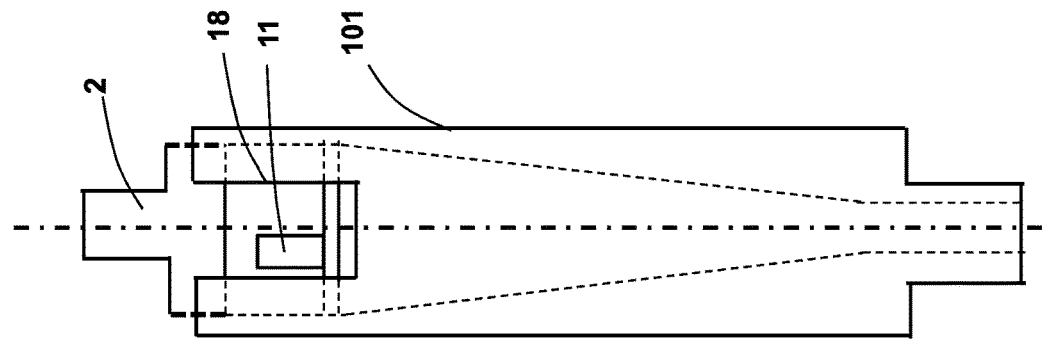
FIG. 14 schematically illustrates the side view of the hydrocyclone of FIG. 13.
Figure 13:
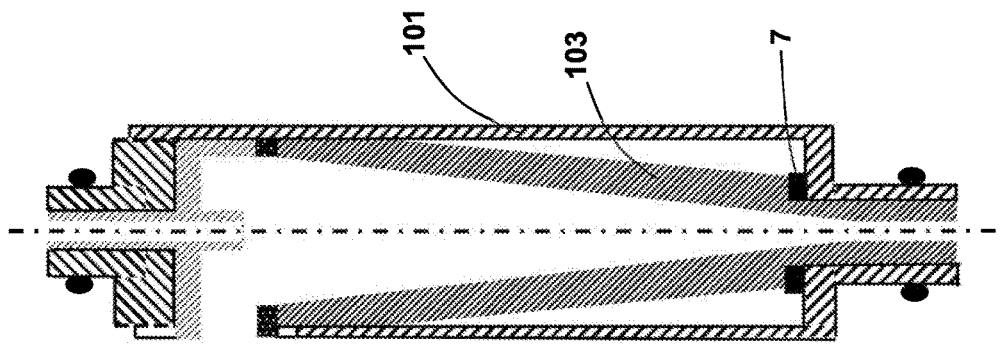
FIG. 13 shows a cross sectional view in the axial direction of a hydrocyclone along the lines B and B'.

FIG. 13 illustrates an alternative embodiment, a side view of the same embodiment is shown on FIG. 14. In this embodiment the main body 103 comprises as an integral part thereof a tube shaped insert at the lower end thereof. The insert sealing 7 is arranged where the main body 103 enters the corresponding outlet of the main enclosure part 101, which in this embodiment comprises the lower enclosure part including the corresponding lower outlet as an integral part thereof. In the upper end of the main enclosure part a slot 18 is arranged in the section comprising internal mateable circumferential threads. In the slot 18 the feed inlet 11 is arranged. The upper enclosure part 2 is screwed into the upper section of the main part 101. In this embodiment the outer surface of the main ceramic body 103 is conically shaped.

In one embodiment (not shown) the hydrocyclone also comprises a locking ring with circumferential threads mateable with said circumferential threads of the metallic enclosure part, to be turned or screwed tight to secure against loosening of two metallic enclosure parts that are screwed together. In an embodiment the locking ring is turned around the treads on the outside of the upper threads on the main metallic enclosure part until it abuts the end of the upper metallic enclosure part. In another embodiment the locking ring is screwed on the inside of the upper section of the main metallic enclosure part until it abuts the upper metallic enclosure part.

In yet another embodiment in a section where two metallic enclosure parts overlaps, there are arranged one or more treaded holes (not shown) in the lower metallic enclosure part, with set screw(s) fitted into said treaded holes. The set screws are to be screwed tight, so the set screws stop at the surface of the upper metallic enclosure part, to ensure secure locking between the two metallic enclosure parts.

FIG. 15 schematically illustrates how the hydrocyclones can be arranged in a fixed secure manner inside a chamber. The chamber comprises a feed inlet 26 and an upper outlet 29. The hydrocyclones are secured to a first pressure retaining plate 27 by upper external threads 23 in the upper metallic enclosure part 2 by an upper external sealing 16 and a nut 24 fastening the first retaining plate 27 to the upper metallic enclosure part 2. The hydrocyclones are further secured to a second pressure retaining plate 28 by the lower external sealing 17. In this embodiment, the main enclosure part 1 and the main body 3 are both conically shaped. Further in this embodiment the ceramic insert 4 comprises a flange in the upper section thereof increasing the strength thereof and the insert sealing 7 is arranged in the groove formed on the lower side of the flange. To be able to fit/arrange as many hydrocyclones in the chamber as possible and at the same time obtain a high efficiency of the hydrocyclones, an important feature of the hydrocyclone is that the inner diameter of the upper section of the main metallic enclosure part is at least 0.03 mm larger and maximum 0.5 mm larger than said outer diameter of the upper section of the ceramic cyclone main body.

Further, this embodiment provides a compact hydrocyclone chamber allowing a plurality of hydrocyclones, having a relative small footprint, to be arranged in a chamber.

A further benefit of achieving a smaller diameter of the hydrocyclones may further reduce the necessary thickness of the chamber and retaining plates 27,28, where the reduced diameter of the hydrocyclones will reduce the necessary weight and manufacturing cost of the chamber and associated retaining plates 27,28. So, even a small reduction of the effective diameter of the hydrocyclone can provide large weight and cost savings.

FIG. 16 illustrates an embodiment wherein a lower metallic enclosure part 6 with a lower insert sealing 7 is arranged to compress against the ceramic cyclone main body 3 with integral lower part 103. Compression for holding the ceramic parts 103,5,8 in place is transferred from the main body 103 to the ceramic washer 8, and from the washer 8 to the head part 5. A second upper insert sealing 107 is arranged between the head part 5 and the upper enclosure part 2. The main metallic enclosure part 1 comprises internal threads 20 in the upper section and internal treads 22 in the lower section connecting the main part 1 to the lower part 6. The metallic parts 1,2,6 are connected forming a metal enclosure surrounding the ceramic parts further kept in place by the sealing inserts 7,107 arranged where compression force is transferred from the enclosure to the ceramic parts 5,103.

As can be seen, the metal enclosure encloses all the radial surfaces of the ceramic cyclone main body, but not the axial end surfaces at the outlet of the ceramic cyclone main body.

FIG. 17 illustrates a side view of the same embodiment, where the feed inlet 11 is arranged to correspond with an opening/slot in the main metallic part 1. A part of the washer 8, the head 5 and the main body 103 is also visible through the opening in part 1. In this embodiment, during assembling, the spinning of the ceramic elements 103, 5,8 is stopped by friction of the compressed insert sealings 7, 107 that are between the compressed metallic enclosure 2,6 and the ceramic element 5,103 by friction. Further the ceramic head 5 may, as discussed in connection with FIG. 4, be formed with variations in the outer diameter and the upper metallic part may comprise an internal curvature adapted to receive the ceramic head 5 and avoid rotational movement of the ceramic head 5.

In this embodiment the main metallic enclosure part 1 is, during assembly, past over the feed opening 11 in the ceramic head 5 and said section and the washer 8 must have an outer diameter adapted to be passed through the main part.

| Reference numbers: | |
|---|---|
| 1 | Main metallic enclosure part |
| 2 | Upper metallic enclosure part |
| 3 | Ceramic cyclone main body |
| 4 | Ceramic insert |
| 5 | Ceramic cyclone head |
| 6 | Lower metallic enclosure part |
| 7 | Insert sealing |
| 8 | Ceramic washer |
| 9 | Gap |
| 10 | Vortex finder |
| 11 | Feed inlet |
| 11' | Feed inlet |
| 12 | Upper outlet |
| 13 | Lower outlet |
| 14 | Head chamber |
| 15 | Main chamber |
| 16 | Upper external sealing |
| 17 | Lower external sealing |
| 18 | Slot |
| 19 | Threads on upper section of metallic main enclosure part |
| 20 | Threads on lower section upper enclosure part |
| 21 | Threads on lower section of metallic main enclosure part |
| 22 | Threads on upper section of lower enclosure part |
| 23 | Upper external threads |
| 24 | Nut |
| 25 | Metallic washer |
| 26 | Chamber feed inlet |
| 27 | First pressure retaining plate |
| 28 | Second pressure retaining plate |
| 29 | Chamber upper outlet |
| 30 | Upper section of ceramic cyclone main body |
| 31 | In between section of ceramic cyclone main body |
| 32 | Lower section of ceramic cyclone main body |
| 33 | Lower rounded corner of ceramic cyclone main body |
| 101 | Main metallic enclosure part with integral lower part |
| 103 | Ceramic cyclone main body with integral insert |
| 107 | Upper insert sealing |

The invention claimed is:

1. Hydrocyclone comprising:
a ceramic cyclone head with at least one feed inlet, an upper outlet, and a head chamber;
a ceramic cyclone main body with a lower outlet and a main chamber, the ceramic cyclone main body being connected to the ceramic cyclone head such that the head chamber is in fluid communication with the main chamber; and
a metal enclosure with a feed inlet opening and outlet openings;
wherein the metal enclosure comprises at least an upper metallic enclosure part adapted to enclose at least part of the ceramic cyclone head and a main metallic enclosure part adapted to enclose at least a part of the ceramic cyclone main body,
wherein the upper metallic enclosure part comprises mateable circumferential threads in a lower section thereof and the main metallic enclosure part comprises mateable circumferential threads in an upper section thereof, and
wherein the mateable circumferential threads of the upper metallic enclosure part and the mateable circumferential threads of the main metallic enclosure part are mateable with each other.

2. The hydrocyclone according to claim 1, wherein:
the ceramic cyclone head has an outer periphery with variable radial extension;
one of the lower section of the upper metallic enclosure part or the upper section of the main metallic enclosure part comprises at least one open ended slot across the mateable circumferential threads of the one of the lower section of the upper metallic enclosure part or the upper section of the main metallic enclosure part;
a width of the at least one open ended slot fits a first section of the ceramic cyclone head comprising the at least one feed inlet;
the outer periphery of the first section of the ceramic cyclone head extends further radially than an outer diameter of the mateable circumferential threads of the one of the lower section of the upper metallic enclosure part or the upper section of the main metallic enclosure part; and
the outer periphery of at least one second section of the ceramic cyclone head has a radial extension which is equal to or less than the outer diameter of the mateable circumferential threads of the one of the lower section of the upper metallic enclosure part or the upper section of the main metallic enclosure part.

3. The hydrocyclone according to claim 2, wherein an axial height of the at least one open ended slot is at least equal or greater than a sum of a height of an overlap of the mateable circumferential threads of the upper metallic enclosure part and the mateable circumferential threads of the main metallic enclosure part, a height of a ceramic inlet floor and a height of the at least one feed inlet.

4. The hydrocyclone according to claim 2, wherein the at least open ended one slot is in the main metallic enclosure part.

5. The hydrocyclone according to claim 2, wherein the at least open ended one slot is in the upper metallic enclosure part.

6. The hydrocyclone according to claim 2, further comprising a ceramic washer arranged to be compressed in between the ceramic cyclone head and the ceramic cyclone main body,
wherein the ceramic washer has an inner diameter that is equal to or larger than an inner diameter of the ceramic cyclone head which the ceramic washer is to be compressed against,
wherein the ceramic washer also forms a floor of the at least one feed inlet such that the ceramic washer within an opening of the at least one open ended slot of the metal enclosure extends further radially than the outer diameter of the mateable circumferential threads of the one of the lower section of the upper metallic enclosure part or the upper section of the main metallic enclosure part, and
wherein other sections of the ceramic washer extend radially equal to or less than an inner diameter of the main metallic enclosure part.

7. The hydrocyclone according to claim 6, wherein the ceramic washer and the ceramic cyclone main body form one integral part.

8. The hydrocyclone according to claim 6, wherein the ceramic cyclone head comprises a separate ceramic roof part, and
wherein the ceramic cyclone main body, the ceramic washer and a part of the ceramic cyclone head form one integral ceramic part, such that the hydrocyclone comprises only two ceramic parts, the one integral ceramic part and the separate ceramic roof part.

9. The hydrocyclone according to claim 2, wherein the ceramic cyclone head forms two side walls extending from the at least one feed inlet, and
   wherein each of the two side walls has a variable thickness and curvature in a radial direction.

10. The hydrocyclone according to claim 1, wherein the upper metallic enclosure part comprises an external metallic sealing surface comprising an upper external sealing for connecting the upper outlet, and
   wherein the main metallic enclosure part comprises an external metallic sealing surface comprising a lower external sealing for connecting the lower outlet.

11. The hydrocyclone according to claim 1, wherein the ceramic cyclone main body consists of several ceramic parts.

12. The hydrocyclone according to claim 11, further comprising an insert sealing for transferring compression force from the metal enclosure to the ceramic parts, such that the ceramic parts are maintained in position and enclosed by the metal enclosure.

13. The hydrocyclone according to claim 12, wherein the main metallic enclosure part comprises a separate lower metallic enclosure part connectable to the main metallic enclosure part, and
   wherein the insert sealing is a lower insert sealing for transferring the compression force between the ceramic cyclone main body and the separate lower metallic enclosure part.

14. The hydrocyclone according to claim 13, further comprising an upper insert sealing for transferring the compression force between the ceramic cyclone head and the upper metallic enclosure part.

15. The hydrocyclone according to claim 12, wherein the insert sealing is an upper insert sealing for transferring the compression force between the ceramic cyclone head and the upper metallic enclosure part.

16. The hydrocyclone according to claim 1, wherein the upper metallic enclosure part comprises upper external threads on an upper outlet,
   wherein the upper external threads are adapted for securing the hydrocyclone with a nut to a first pressure retaining plate within a hydrocyclone chamber,
   wherein the hydrocyclone chamber comprises a second pressure retaining plate spaced apart from the first pressure retaining plate, and
   wherein the second pressure retaining plate is adapted to receive and maintain a lower end of the hydrocyclone in position.

17. The hydrocyclone according to claim 1, wherein an outer diameter of an upper section of the ceramic cyclone main body and an outer diameter of a lower section of the ceramic cyclone main body are larger than an outer diameter of an intermediate section of the ceramic cyclone main body in between the upper section of the ceramic cyclone main body and the lower section of the ceramic cyclone main body, and
   wherein an inner diameter of the upper section of the main metallic enclosure part is at least 0.03 mm larger and maximum 0.5 mm larger than the outer diameter of the upper section of the ceramic cyclone main body.

18. The hydrocyclone according to claim 1, wherein:
   the ceramic cyclone head has an outer periphery with variable radial extension;
   one of the lower section of the upper metallic enclosure part or the upper section of the main metallic enclosure part comprises at least one open ended slot across the mateable circumferential threads of the one of the lower section of the upper metallic enclosure part or the upper section of the main metallic enclosure part;
   a width of the at least one open ended slot fits a first section of the ceramic cyclone head comprising the at least one feed inlet; and
   wherein the outer periphery of the first section of the ceramic cyclone head extends further radially than an inner diameter of one of the supper metallic enclosure part or the main metallic enclosure part.

19. A hydrocyclone chamber comprising:
   a plurality of hydrocyclones,
   wherein each of the plurality of hydrocyclones comprises:
   a ceramic cyclone head with at least one feed inlet, an upper outlet, and a head chamber;
   a ceramic cyclone main body with a lower outlet and a main chamber, the ceramic cyclone main body being connected to the ceramic cyclone head such that the head chamber is in fluid communication with the main chamber; and
   a metal enclosure with a feed inlet opening and outlet openings,
   wherein the metal enclosure comprises at least an upper metallic enclosure part adapted to enclose at least part of the ceramic cyclone head and a main metallic enclosure part adapted to enclose at least a part of the ceramic cyclone main body,
   wherein the upper metallic enclosure part comprises mateable circumferential threads in a lower section thereof and the main metallic enclosure part comprises mateable circumferential threads in an upper section thereof, and
   wherein the mateable circumferential threads of the upper metallic enclosure part and the mateable circumferential threads of the main metallic enclosure part are mateable with each other.

20. The hydrocyclone chamber according to claim 19, wherein each of the plurality of hydrocyclones further comprises upper external threads on an upper outlet of the upper metallic enclosure part, and
   wherein the hydrocyclone chamber further comprises:
   a feed inlet;
   an upper outlet;
   a first pressure retaining plate comprising nuts for securing each of the plurality of hydrocyclones, respectively, to the first pressure retaining plate; and
   a second pressure retaining plate spaced apart from the first pressure retaining plate, the second pressure retaining plate being adapted to receive and maintain a lower end of each of the plurality of hydrocyclones in position.

* * * * *